(No Model.)

G. H. FOWLER.
HORSE HAY FORK.

No. 245,475. Patented Aug. 9, 1881.

WITNESSES:
Theo. G. Hoster
A. Sedgwick

INVENTOR:
G. H. Fowler
BY Munn & Co
ATTORNEYS.

UNITED STATES PATENT OFFICE.

GEORGE H. FOWLER, OF TAUGHANNOCK FALLS, NEW YORK.

HORSE HAY-FORK.

SPECIFICATION forming part of Letters Patent No. 245,475, dated August 9, 1881.

Application filed June 13, 1881. (No model.)

*To all whom it may concern:*

Be it known that I, GEORGE H. FOWLER, of Taughannock Falls, in the county of Tompkins and State of New York, have invented a new and useful Improvement in Horse Hay-Forks, of which the following is a specification.

Figure 1:
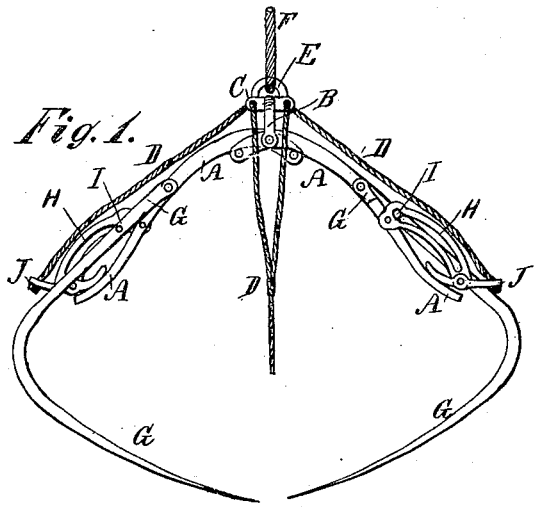
Figure 2:
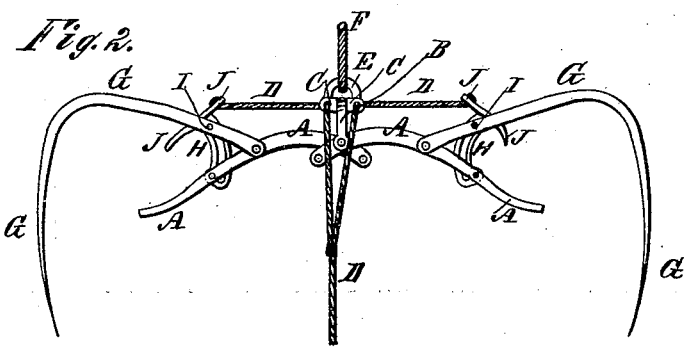
Figure 3:
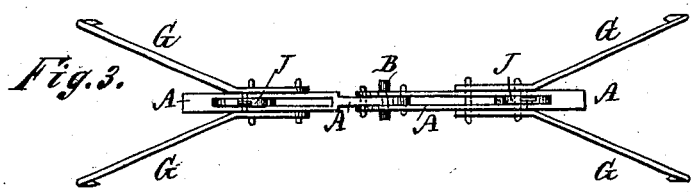
Figure 4:
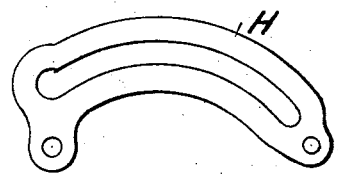

Figure 1 is a side elevation of a fork in position for holding a load, part being broken away. Fig. 2 is a side elevation of the same in position for discharging the load. Fig. 3 is a plan view of the same. Fig. 4 represents one of the locking-hooks enlarged.

Similar letters of reference indicate corresponding parts.

The object of this invention is to promote convenience in operating horse hay-forks.

The invention consists in a horse hay-fork constructed with grappling-bars hinged to each other by a cross-head clevis, the hinged tines, the hinged locking-hooks having guide-slots, and the trip-levers to receive the trip-rope, whereby the loaded tines will be locked in place automatically, and unlocked by operating the trip-levers, as will be hereinafter fully described.

In the accompanying drawings, A represents two bars, called by me "grappling-bars," which are hinged to each other at or near their inner ends by the bolt of the clevis B. The clevis B is made with a cross-head, C, upon its bend, and has eyes in the ends of the said cross-head to receive the branched ends of the trip-rope D. The clevis B is also made with an eye or loop, E, to receive the end of the hoisting-rope F.

To each grappling-bar A, at or near its center, is hinged the end of the shanks of one or more tines, G, which are curved, as shown in Figs. 1 and 2.

To each grappling-bar A, at a little distance from the end of the tines G, is hinged a curved and slotted bar, H, called by me a "locking-hook," the hinging-bolt passing through a lug upon the concave side of the said hook at its end. The locking-hook H is connected with the shank of the tines G by a bolt, I, passing through the said tines and through the slot of the said hook, so as to keep the said hook in place, while allowing the tines to move freely. In the hinged end of the locking-hook H, at the convex side of its slot, is formed a recess to receive the bolt I and lock the tines G and grappling-bars A in place when brought together.

To the free end of the locking-hook H is hinged the middle part of a short trip-lever, J, to the outer end of which is attached the end of a branch of the trip-rope D.

In using the fork, when the various parts are in the position shown in Fig. 2 the tines G are thrust into the hay, and as the said tines are forced down the hay coming in contact with the ends of the grappling-bars A forces the said ends upward, drawing the ends of the tines inward, and causing the locking-hooks H to slide along the bolts I into the positions shown in Fig. 1, so that the said bolts I will enter the locking or hooking recesses in the said hooks. As the grappling-bars, the tines, and the locking-hooks approach each other the ends of the grappling-bars come in contact with the ends of the trip-levers J, and bring them into the position shown in Fig. 1, when the tines will be securely locked in place. When the loaded fork reaches the place where it is to be unloaded the trip-rope D is drawn upon, which operates the trip-levers J. The movements of the trip-levers J raise the recesses of the locking-hooks H off the bolts I and force the grappling-bars A and the tines G from each other, the ends of the grappling-bars A pressing against the hay and forcing the said hay off the tines, so that the load will be readily discharged. By keeping the trip-rope D taut while the fork is being carried back to receive another load the tines will be held ready to enter the hay, as shown in Fig. 2; or the trip-rope may be slackened and the fork drawn back with the tines to the position shown in Fig. 1, when the tines must be drawn back or adjusted before being thrust into the hay.

Having thus fully described my invention, I claim as new and desire to secure by Letters Patent—

1. A horse hay-fork, constructed substantially as herein shown and described, consisting of the grappling-bars A, the cross-head clevis B C, the hinged tines G, the locking-hooks H, and the trip-levers J, as set forth.

2. In a horse hay-fork, the combination, with the tines G, of the grappling-bars A, hinged to each other, the locking-hooks H, and the trip-levers J, substantially as herein shown and described, whereby the loaded tines will be locked in place automatically, and unlocked by operating the trip-levers, as set forth.

GEORGE H. FOWLER.

Witnesses:
SAMUEL ALMY,
ORVILLE D. CROGAN.